July 3, 1934. W. A. WALKER 1,965,015
DUAL CONTROL FOR SHAPERS
Filed Aug. 20, 1932 3 Sheets-Sheet 1
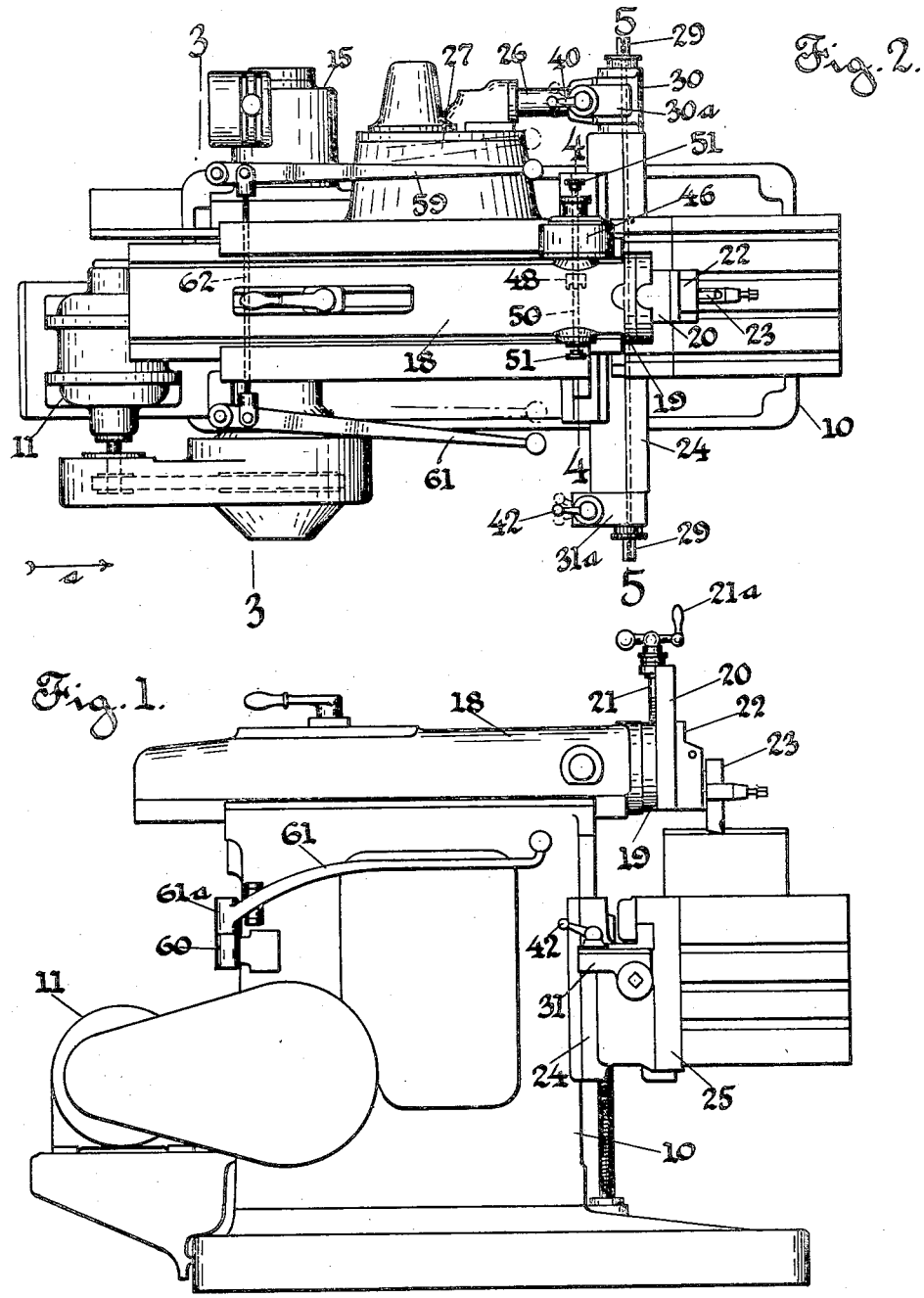

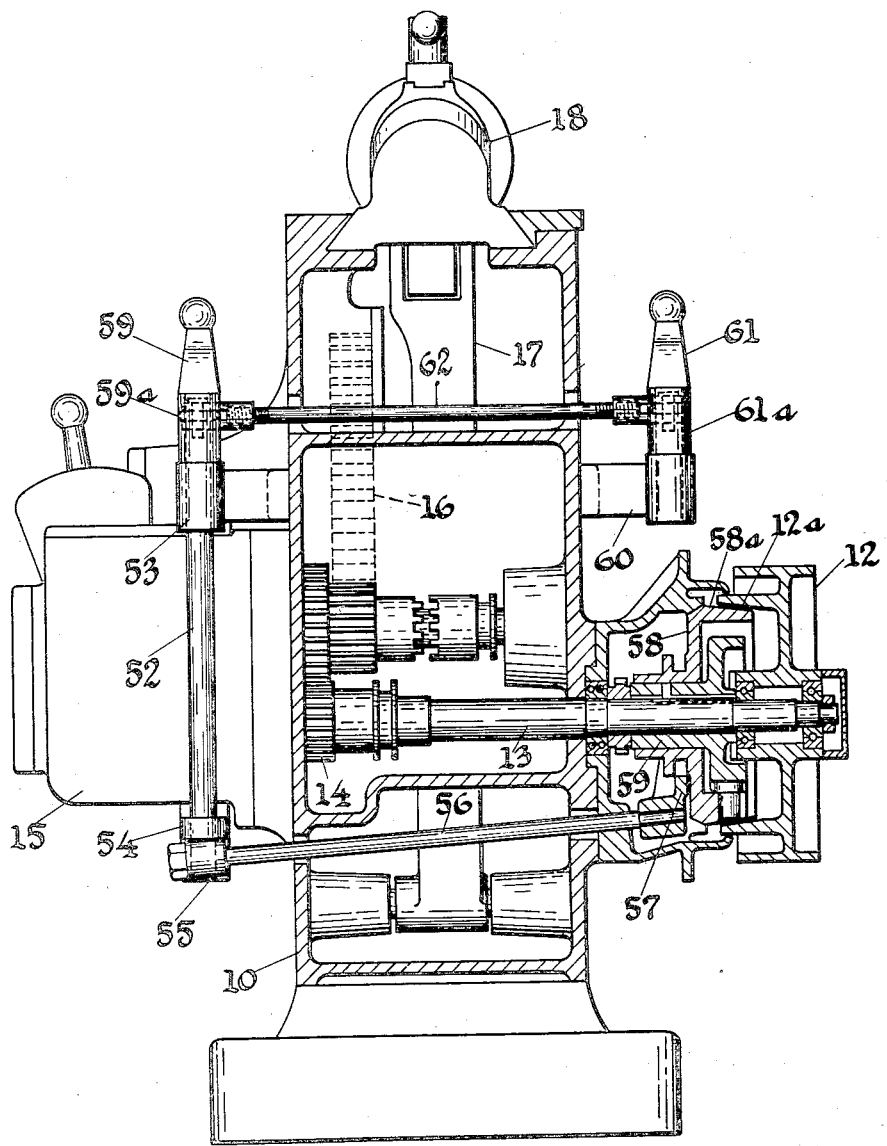

July 3, 1934.  W. A. WALKER  1,965,015
DUAL CONTROL FOR SHAPERS
Filed Aug. 20, 1932   3 Sheets-Sheet 3
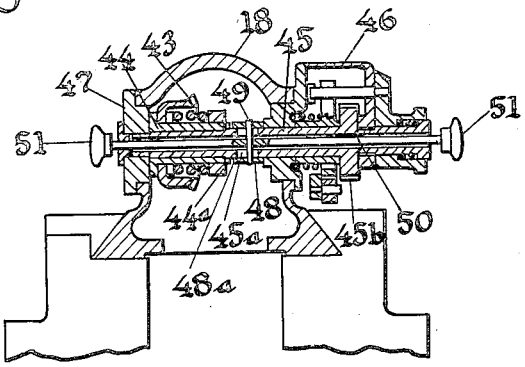
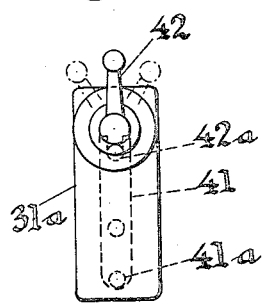
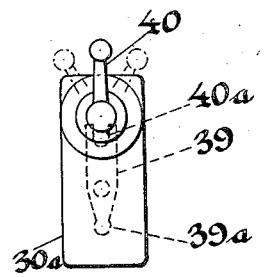
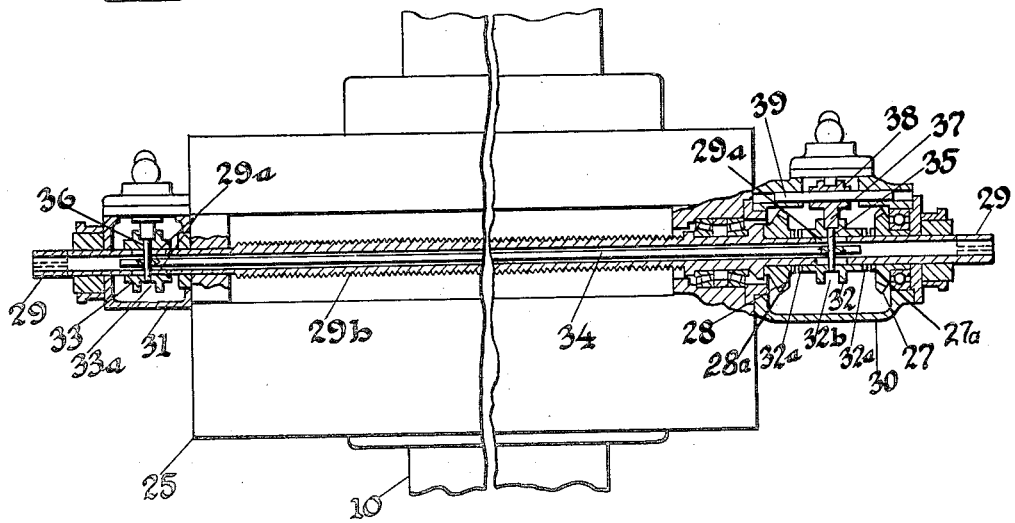
Inventor
William A. Walker.
By Ernest R. Llewellyn.
Attorney.

Patented July 3, 1934

1,965,015

UNITED STATES PATENT OFFICE 1,965,015

DUAL CONTROL FOR SHAPERS

William A. Walker, Torrington, Conn., assignor to The Hendey Machine Company, Torrington, Conn., a corporation of Connecticut Application August 20, 1932, Serial No. 629,639

1 Claim. (Cl. 90—38)

This invention relates to an improvement in shapers and more particularly to a dual control for the operation of the various elements of the machine.

In the design and construction of shapers it has been customary to place the control levers and handles on the right hand side of the machine as it has always been assumed that the operator would desire to work from this side. This contention is correct under ordinary conditions where the tool is travelling toward left of the machine and away from the operator or where the operator stands at the front of the machine, facing the cutting tool.

There are many operations wherein it is advantageous for the operator to watch the cutting of the tool from the left hand side of the machine. One operation in particular is that of undercutting with a substantial length of stroke of the cutting tool. Other operations are those of forming which requires the operator to follow a scribed line of contour.

In performing operations of this character it has been necessary for the operator to pass from the left of the machine to the right hand side, in starting or stopping the machine or to make necessary adjustments of the feed controls and the engaging or disengaging of these controls.

Accordingly, the object of my present invention is to provide a shaper with dual controls, conveniently arranged within the range of reach of the operator and on the opposed sides of the machine and whereby the operator will have complete control of starting, stopping or adjusting the elements regardless of which side of the machine it may be necessary or desirable to work from.

With the above and other objects in view my invention comprises a novel combination and arrangement of parts hereinafter described and more specifically pointed out in the appended claim.

In the accompanying drawings I have shown my invention embodied with a shaper, of the usual and well known construction, sufficient to enable those skilled in the art to understand the construction and operation thereof.

Referring to the drawings:—

Fig. 1 is a left hand side elevation of a shaper;

Fig. 2 is a plan view of the shaper shown at Fig. 1;

Fig. 3 is a transverse section taken substantially along line 3—3, Fig. 2, viewing in direction of arrow $a$, same figure;

Fig. 4 is a sectional view taken substantially along line 4—4, Fig. 2;

Fig. 5 is a sectional view taken substantially along line 5—5, Fig. 2;

Fig. 6 is a plan view of one of the right hand control levers, as shown at Fig. 5; and Fig. 7 is a plan view of one of the left hand control levers, as shown at Fig. 5.

The shaper base 10 has mounted therewith a motor 11 which is provided with a suitable driving connection to a clutch pulley 12 freely mounted on the drive shaft 13, see Fig. 3.

A pinion 14, secured to the drive shaft, engages with and rotates the gearing contained in the usual change gear box 15, and through intermediate gearing, rotates the enclosed bull gear 16. Through the usual driving connections, the bull gear 16 oscillates the stroke arm 17 which is pivotally connected to the ram 18 which is mounted for reciprocation in suitable ways in the base 10.

The ram 18 is provided with the usual tool head 19 provided with suitable ways to slidably receive the tool slide 20. Said tool slide 20 is provided with an externally threaded down feed screw 21 which engages an internally threaded bore in the tool head 19. Said screw 21 is provided with a handle 21a by which the screw 21 is manually rotated to position said slide 20 relative to the tool head 19 and work.

A clapper box 22 is adjustably secured to the tool slide 20 and pivotally supports the clapper to which the cutting tool 23 is secured.

The base 10 is provided with suitable guide rails adapted to support the vertically adjustable cross head 24 to which is slidably mounted, for transverse movement, the work table saddle 25.

The above construction and the operation thereof is well known to those skilled in the art, therefore, further detailed description is thought to be unnecessary.

A shaft, within the housing 26, is driven from the usual connecting gears, in the gear box 27, see Fig. 2. This shaft is provided with gearing, not shown, see Fig. 5, which engages and rotates the pinions 27, 28 which are freely mounted for rotation on a hollow feed screw 29 which is rotatably supported in suitable bearings, in the cross head 25 and housings 30, 31 secured to said cross head 25. Said pinions 27, 28, are provided with clutch teeth 27a, 28a, adapted to be engaged by corresponding clutch teeth 32a of the clutch 32, slidably mounted on the feed screw 29 and positioned between said pinions. Slidably mounted adjacent the opposed end of said feed screw 29 and within the housing 31 is a collar 33.

Contained within the bore, of the feed screw 29, is a connecting rod 34 which has secured therein, adjacent the opposed ends thereof, the connecting pins 35, 36, which extend through slots 29a, in the feed screw, and are secured in the clutch member 32 and collar 33 and thereby cause said members to be rotated, as a unit, with the feed screw 29.

The clutch member 32 is provided with an annular recess 32b adapted to be engaged by a fork 37 having its hub 38 secured on a pin 39 slidably mounted in suitable bearings in the housing 30. The hub 38 is adapted to be engaged by one end 39a of a lever 39 pivotally connected to the cap plate 30a of the housing 30. The opposed end of the lever 39 is adapted to be engaged by a ball 40a of a lever 40 pivotally secured to the cap plate 30a.

The collar 33 is provided with an annular recess 33a adapted to receive one end 41a of a lever 41 pivotally connected to the cap plate 31a of the housing 31. The opposed end of said lever 41 is adapted to be engaged by the ball 42a of a lever 42 pivotally secured to the cap plate 31a. As one of the levers 40, 42, is moved to its engaging position, as shown by broken lines, the opposed lever 40, 42, through the connecting rod 34, is correspondingly moved.

The clutch as shown at Fig. 5, is in a neutral position. Through the positioning of the levers 40, 42, the clutch will be moved into engagement with one of the pinions 27 and thus cause the feed screw to be rotated in one direction. When the clutch is moved into engagement with the opposed pinion 28, the feed screw is rotated in its opposite direction, the externally threaded portion 29b of the feed screw engages a nut, not shown, which is secured to the table saddle 25 and causes said saddle and table to be moved transversely and in either direction corresponding to the rotation of the cross feed screw 29. The opposed ends of the cross feed screw 29 are adapted to receive a crank for convenience in manually rotating said screw where it is so desired to feed the table and work transversely relative to the cutting tool.

At Fig. 4, I have shown the usual down feed mechanism for the cutting tool which comprises a gear 43 which meshes with a pinion (not shown) on the down feed screw 21, said gear 43 being suitably connected to a clutch bushing 44 which is freely rotatable on a hollow shaft 45 mounted in suitable bearing in the housing 46 and cap 47 secured to the ram 18.

The hollow shaft has, in this instance, formed integral therewith, the feed ratchet 45b which is rotated in the well known manner with an adjustable actuating dog.

A clutch 48 is slidably mounted on the hollow shaft 45 and has secured therein the opposed ends of a pin 49 which extends through slots 45a, in the shaft 45. Said pin 49 is secured in a shaft 50 which extends longitudinally through the bore of said hollow shaft 45. Said shaft 50 has opposed operating knobs 51 secured to the outer ends thereof. The clutch 48 is provided with clutch teeth 48a adapted to engage corresponding teeth of the sleeve 44.

As shown in the drawings, Fig. 4, the clutch 48 is in a neutral position which permits manually down feeding the cutting tool through rotating the screw 21. When it is desired to use the power down feed, the operator may, from either side of the machine, by pulling or pushing the rod 50, cause the clutch teeth 48a, 44a, to engage and through the gear 43 rotate the down feed screw 21.

A shaft 52 is rotatably supported in suitable brackets 53, 54, secured to the machine. Secured to the lower end of the shaft 52 is a lever 55 which has secured thereto, at the outer end 55 thereof, one end of a connecting rod 56. The opposite end of said rod 56 has secured thereto, the hub of a clutch fork 57 which engages with an annular recess in the clutch member 58 which is slidably mounted on a sleeve 59 secured to the drive shaft 13. The external inclined face 58a is adapted to engage the internal inclined face 12a of the pulley 12, and through engagement, cause said shaft 13 and elements associated therewith, to be rotated in unison with said pulley.

Secured to the upper end of the shaft 52 is the hub 59a of the lever 59. Secured to the opposite side of the machine is a bracket 60 which pivotally supports the hub 61a of the lever 61. A connecting rod 62 extends through suitable openings in the machine and has its opposed ends pivotally secured to the levers 59, 61. The two levers 59, 61, being connected, the operator may, from either side of the machine, move said levers, and through intermediate connections engage or disengage the clutch member 58 with the driving pulley 12.

Having thus described my invention it will be evident that many changes and modifications may be made therein by those skilled in the art without departing from the spirit and scope thereof, therefore I do not wish to be limited to the specific details herein disclosed, but what I claim is:

A shaper having a base, a ram mounted for reciprocation relative to said base, a cutting tool carried by said ram, driving means for said reciprocating means, a work table support carried by said base and having a work table slidably mounted thereon, means for vertically adjusting said work table relative to said base and cutting tool, optional manual and power means for transversely moving said table relative to said base and cutting tool, said last named means comprising a hollow feed screw having an externally threaded portion adapted to engage and traverse said work table, oppositely disposed driven pinions freely rotatable on said hollow screw, clutch teeth integral with said pinions, a clutch slidably mounted on said hollow feed screw and rotatable therewith, said clutch having opposed clutch teeth adapted to be engaged with said pinion clutch teeth, control means disposed adjacent the opposed ends of said feed screw and concomitantly operable to engage and disengage said clutch with said opposed pinions.

WILLIAM A. WALKER.